United States Patent
Griessmann

(10) Patent No.: US 11,474,870 B2
(45) Date of Patent: Oct. 18, 2022

(54) TRANSFER OF EMBEDDED SOFTWARE DATA INTO PLM INSTANCE

(71) Applicant: SAP SE, Walldorf (DE)

(72) Inventor: Jens Griessmann, Walldorf (DE)

(73) Assignee: SAP SE, Walldorf (DE)

(*) Notice: Subject to any disclaimer, the term of this patent is extended or adjusted under 35 U.S.C. 154(b) by 247 days.

(21) Appl. No.: 16/827,834

(22) Filed: Mar. 24, 2020

(65) Prior Publication Data
US 2021/0303362 A1   Sep. 30, 2021

(51) Int. Cl.
*G06F 9/50* (2006.01)
*G06F 8/71* (2018.01)
*G06F 8/10* (2018.01)

(52) U.S. Cl.
CPC .............. *G06F 9/5055* (2013.01); *G06F 8/10* (2013.01); *G06F 8/71* (2013.01)

(58) Field of Classification Search
CPC .... G06F 30/00; G06F 11/368; G06F 11/3672; G06F 30/17; G06F 9/5055; G06F 8/71; G06Q 10/10; G06Q 10/06; G06Q 10/087
See application file for complete search history.

(56) References Cited

U.S. PATENT DOCUMENTS

| | | | | |
|---|---|---|---|---|
| 9,009,105 B2* | 4/2015 | Hartig | .................... | G06F 9/4856 707/610 |
| 9,043,755 B2* | 5/2015 | Eska | ......................... | G06F 8/71 717/121 |
| 9,063,777 B2* | 6/2015 | Balko | ...................... | G06F 9/485 |
| 9,110,601 B2* | 8/2015 | Vorsprach | ............. | G06F 3/0608 |
| 9,584,619 B2* | 2/2017 | Tang | ..................... | H04L 67/568 |
| 9,672,494 B2* | 6/2017 | Jolfaei | .................... | G06F 9/466 |
| 2007/0233538 A1* | 10/2007 | Zpevak | ................... | G06Q 99/00 705/7.14 |
| 2008/0300710 A1* | 12/2008 | Cogswell | ............... | G06Q 10/06 700/105 |
| 2009/0300213 A1* | 12/2009 | Khuti | ...................... | H04L 67/63 709/238 |
| 2012/0290342 A1* | 11/2012 | Gower | ................. | G06Q 10/087 705/7.11 |
| 2014/0046184 A1* | 2/2014 | Heinrich | .................. | A61B 8/00 600/595 |
| 2014/0143756 A1* | 5/2014 | Liang | ........................ | G06F 8/70 717/120 |

(Continued)

Primary Examiner — Ninos Donabed
(74) Attorney, Agent, or Firm — Buckley, Maschoff & Talwalkar LLC

(57) ABSTRACT

Provided is a system and method for transferring data attributes of an embedded software program on a device into a PLM instance of the device. Data attributes may be mapped to a predefined data structure of the PLM instance thereby ensuring that the software data is compatible with the process of a PLM environment. In one example, the method may include receiving a request that identifies a software program of an embedded system, identifying data attributes of the software program within a software development application, where the data attributes comprise a description of the software program and a build version of the software program, and translating the identified data attributes of the software program into a predefined data structure of a lifecycle management instance of the embedded system.

13 Claims, 8 Drawing Sheets

(56) References Cited

U.S. PATENT DOCUMENTS

| | | | |
|---|---|---|---|
| 2016/0004791 A1* | 1/2016 | Hollmann | G06F 30/00 700/98 |
| 2016/0055079 A1* | 2/2016 | Hanna | G06F 11/3692 717/135 |
| 2016/0062786 A1* | 3/2016 | Meng | H04L 41/0846 718/1 |
| 2016/0147560 A1* | 5/2016 | Jolfaei | G06F 9/466 718/101 |
| 2017/0214701 A1* | 7/2017 | Hasan | H04L 63/1491 |
| 2017/0236060 A1* | 8/2017 | Ignatyev | G06F 16/2365 706/46 |
| 2017/0322776 A1* | 11/2017 | Griessmann | G06F 8/20 |
| 2017/0330121 A1* | 11/2017 | Sullivan | G06Q 40/10 |
| 2018/0136913 A1* | 5/2018 | Mayer | G06F 8/36 |
| 2018/0246807 A1* | 8/2018 | Andrei | G06F 3/0685 |
| 2021/0117405 A1* | 4/2021 | Saxena | G06F 9/542 |

* cited by examiner

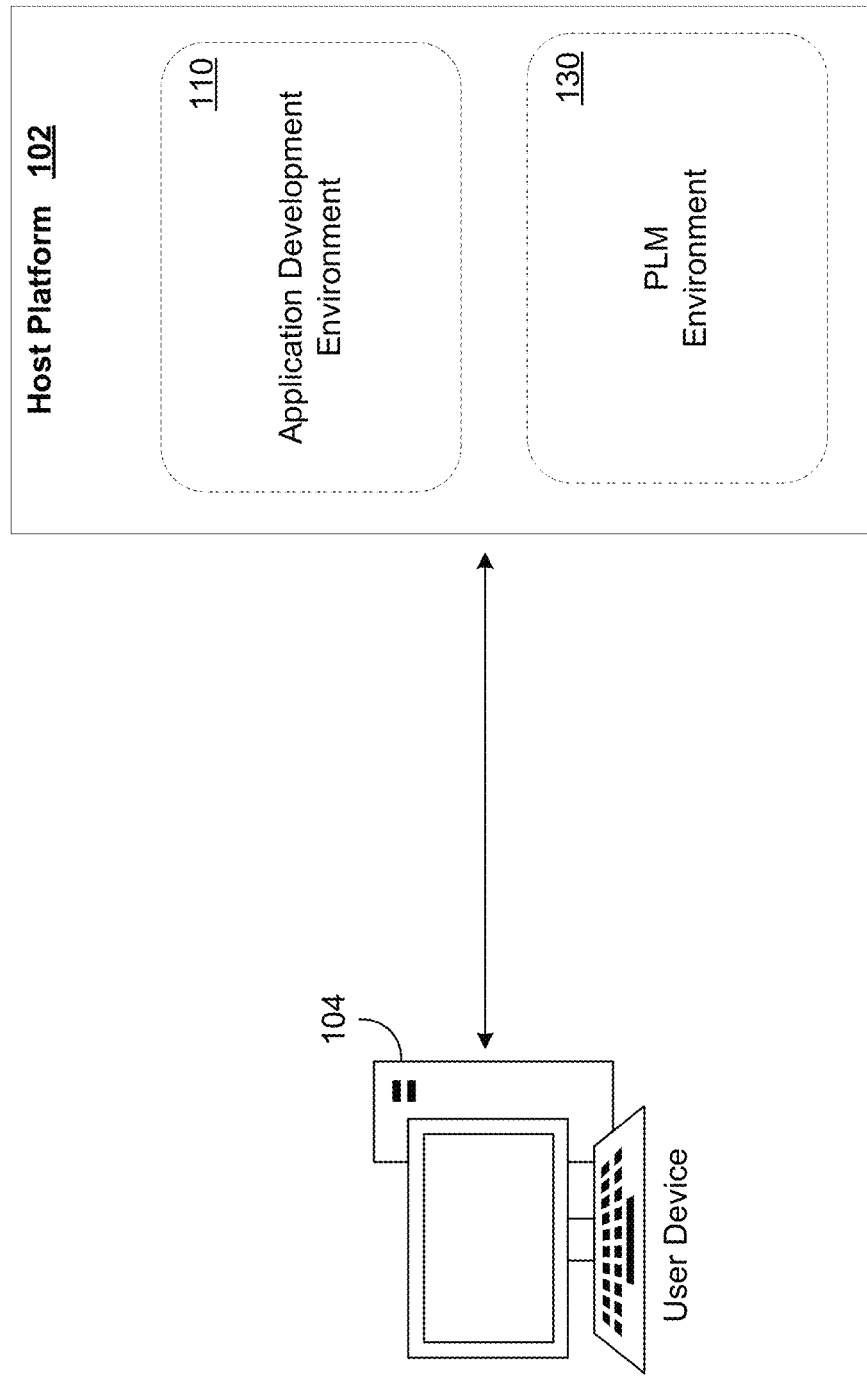

FIG. 3A

Software Project Table 310

| Attribute | Definition |
| --- | --- |
| UUID | Unique Technical ID |
| Project Name | Software Project Name in PLM |
| Job Name | Software Project Name in ALM |
| Job URL | Navigation to Software Project in ALM |
| Serv. Addr. | Navigation to Server Address of Software Project |
| Matter | Reference on Product in PLM |
| Description | Description of Derived from Software Project in ALM |

FIG. 3B

Software Version Table 320

| Attribute | Definition |
| --- | --- |
| UUID | Unique Technical ID |
| Project ID | Software Project Name in PLM |
| SW Version | Software Project Version Label in ALM |
| Mand. Update | Indicator of Whether a Software Update is Mandatory |
| Build URL | Navigation to Software Build in ALM |
| Build Counter | Internal Counter of Build in ALM |
| Build Timestamp | Compilation Time of Software Build |
| Doc. Key | Reference on Document Info Record in PLM |
| Description | Description Derived from Software Build in ALM |

FIG. 3C

| Software Dependency Table 330 | |
|---|---|
| Attribute | Definition |
| UUID | Unique Technical ID |
| Version UID | Unique ID of Software Version in PLM |
| Type | Open Source or Licensed Software |
| Object Type | How the Software is Represented in PLM |
| Software ID | ID of the included software |
| Sftwre Version | Identifier of the Included Software Version |

TRANSFER OF EMBEDDED SOFTWARE DATA INTO PLM INSTANCE

BACKGROUND

An embedded system is a product that includes a computer system (e.g., processor, memory, input/output, etc.) within a larger mechanical and/or electrical system. Consumer electronics, household appliances, automobiles, medical equipment, and industrial machines are just a few examples of embedded systems. Embedded systems enable products to be more intelligent, smaller, faster, lower cost, easy to manage, and the like. As the demand for smart products increases, the role of embedded software becomes more significant.

During the development of an embedded system it is common for the software components to be built separately from the mechanical and/or electrical components. In this case, the software is often developed in an application lifecycle management (ALM) environment that includes processes for building, testing, and continuously integrating the software. Meanwhile, the mechanical and electrical components of the embedded system are often designed and managed within a product lifecycle management (PLM) environment in which the overall product is managed.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1A is a diagram illustrating a host platform which includes a product lifecycle management (PLM) environment in accordance with an example embodiment.

FIGS. 3A-3C are diagrams illustrating data structures storing software data attributes in accordance with example embodiments.

Figure 1B:
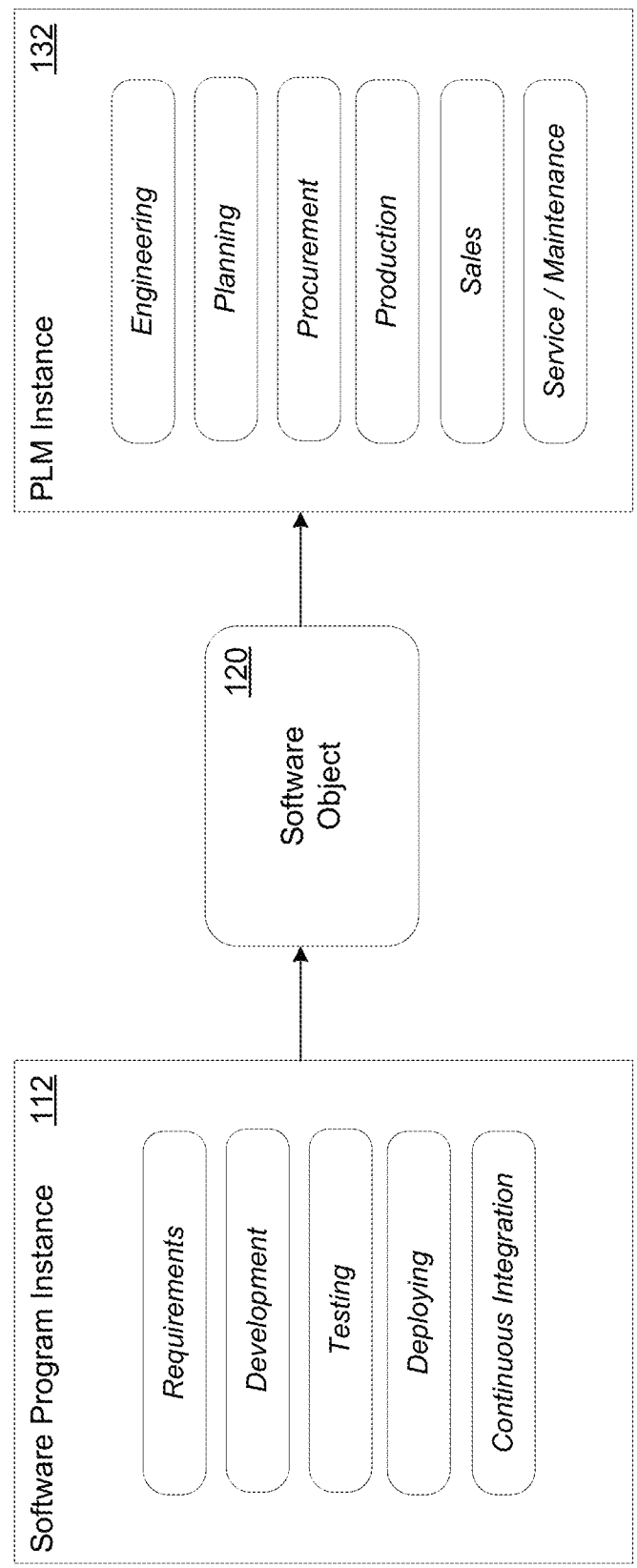
FIG. 1B is a diagram illustrating a process of transferring a software object into a PLM environment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Due to the increasing demand of smarter products, the role of software and embedded systems has also increased. Software is often used to define the mechanical and/or electronic functions of the product. For example, software can be used to provide a user interface, perform guidance, implement machine controls, generate predictive insights, and the like. The more intelligent a product becomes, the better the product can communicate with its environment. In many cases, a physical design of two competitive products may be almost identical, while the software embedded therein is a key differentiator in quality and/or functionality.

An embedded system usually includes one or more software component(s) that are developed and managed within an ALM environment. Meanwhile, a PLM environment manages the product as a whole including the materials, electrical components, mechanical components, software, etc. In many cases, a software developer working in the ALM environment will never interact with the embedded system within the PLM environment. A primary reason for this is that the ALM environment is a different environment from the PLM environment. Therefore, a user must manually incorporate software features of the embedded system from the ALM environment into the PLM environment. This process can be time-consuming and also risks the occurrence of mistakes/errors.

Another problem occurs when the product is being further managed within the PLM environment. For example, the product may have a product instance in which the materials, electrical components, mechanical components, etc., are stored. However, PLM product instance often lacks many of the important details of the software program such as a version, a description, dependency information, locations of the software program, and the like. Furthermore, it can be very difficult for a person to acquire this information after the fact, since production of the software may be finished at this point.

The example embodiments overcome the drawbacks in the art by translating software data from an ALM environment into a product instance in a PLM environment. The system may generate a new data object, referred to herein as a software object, which includes data attributes of a software program from the ALM environment. Furthermore, the system may incorporate the data attributes of the software object into one or more predefined data structures of the PLM product instance. In other words, the system can transfer data from the ALM environment into predefined fields of a PLM product instance thereby enabling the ALM data to be processed and managed with the rest of the materials, electrical components, mechanical components, etc. in the PLM environment. For example, the system may map version information, software name, project information, description, URLs, and the like, from the ALM environment, into data objects/tables of the product instance. Thus, electrical components, mechanical components, and software components of a product instance may be further processed together within the PLM environment.

By mapping the software data from the ALM environment to an existing data structure in the PLM environment, the ALM data becomes compatible with the PLM software. Accordingly, the ALM data can be used for subsequent processes within the PLM environment including procurement, planning, production, sales, service and maintenance, and the like. In addition, the system may also identify and transfer proper documentation of the software down to its version information within the ALM environment into the PLM product instance thereby providing traceability of the components of the software. For example, the software program may include one or more licensed components therein. Determining this information after the fact can be very difficult. To address this, the system may include a list of all version information including dependent software (name, version identifier, etc.) that the embedded software relies on.

FIG. 1A illustrates a computing environment 100 which includes a host platform 102 hosting a product lifecycle management (PLM) environment 130 in accordance with an example embodiment. In this example, the host platform 102 may be a web server, a cloud platform, an on-premise server, a database, a user workstation, and the like. The host platform 102 may also include and host an application lifecycle management (ALM) environment 110. It should be appreciated that the ALM environment 110 and the PLM environment 130 may be hosted on different systems, but for convenience are deployed on the host platform 102. A user may operate a user device 104 and connect to the host platform 102 via a network. Here, the user device 104 may be a desktop computer, a tablet, a mobile device, a server, or the like.

The ALM environment 110 may be managed based on an ALM software application that provides a user with a dedicated user interface and functionality for managing the lifecycle of a software program. Meanwhile, the PLM environment 130 may be managed based on an independent PLM software application that provides the user with a dedicated user interface and functionality for managing the lifecycle of a product as a whole. The ALM environment 110 has to handle complexities that are inherently present in software design, testing, and deployment, while the PLM environment 130 focuses on business processes and structures such as portfolio management and bill of materials (BOM). In this example, the ALM environment 110 may manage software of an embedded system and the PLM environment 130 may manage the materials (mechanical and electrical components) and the business process of the embedded system. Thus, the two environments may co-manage the lifecycle of the embedded system.

Typically the tools with the PLM environment 130 are used by hardware engineering teams to support the physical design and manufacturing of a product. Meanwhile, the tools of the ALM environment 110 can be thought of as a PLM for software and encompasses the development aspect of software only. While PLM and ALM are used for a similar purpose (product development), the two environments have evolved into disciplines that are used separately and have fundamental design differences. As a result, the PLM software often has a different user interface, different data fields, different phases, etc., than the ALM software because the PLM software is dedicated to the business process of the product while the ALM software is dedicated to software development.

For example, the ALM environment 110 may provide processes for requirements management, test management, demand management, change and configuration management, build and release management, variant management, audits, metrics, reporting, etc., continuous integration, and the like. Meanwhile, the PLM environment 130 may provide processes for BOM management, computer aided design (CAD), collaboration, change management, document management, system engineering and development, and compliance. Thus, the features, processes, data fields, etc., are different across both environments.

FIG. 1B Illustrates a process 100B of transferring a software object 120 into a PLM environment in accordance with an example embodiment. Referring to FIG. 1B, the system described herein may extract software data from an instance 112 of a software program in the ALM environment and store the software data within an instance 132 of a PLM product. Here, the instance 132 may include hardware information, business data, etc. of an embedded system which also includes the software stored in the instance 112. The transfer process may be performed by the host platform 102 shown in FIG. 1A. As a non-limiting example, the transfer may be performed by a PLM application, an ALM application, an independent service running on the host platform 102, and the like.

Figure 2:
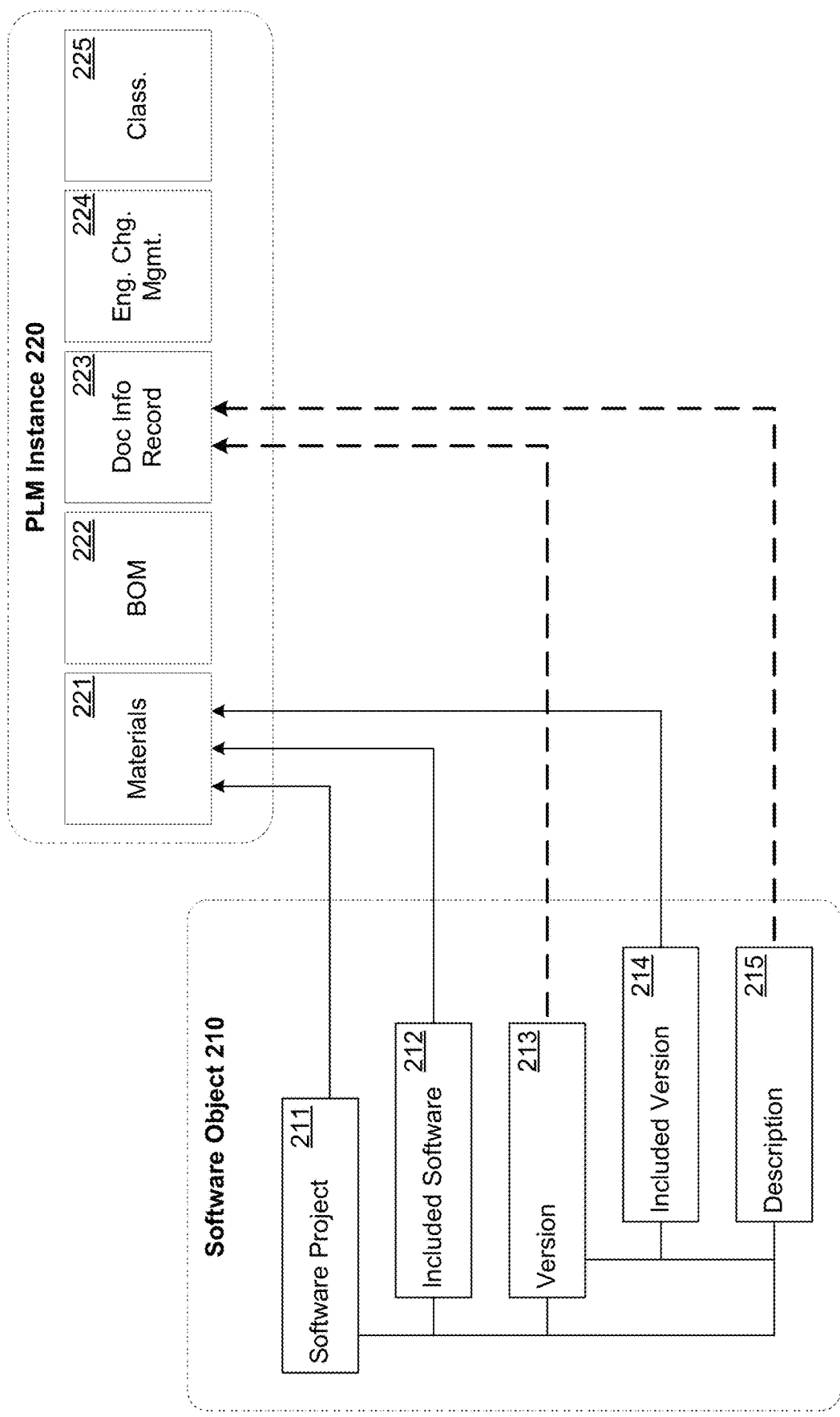
FIG. 2 is a diagram illustrating a process of mapping software data attributes to a PLM instance in accordance with example embodiments.

FIG. 2 illustrates a process 200 of mapping software data from a software project (program) within the ALM environment into a PLM instance of an embedded system in accordance with example embodiments. Referring to FIG. 2, a software object 210 is newly defined herein. The software object 210 includes a modeled hierarchical structure with various building blocks of the software project of the embedded system including a software project node 211 (root node) which stores attributes of a software project within the ALM environment such as common product model definition and a complete lifecycle. For example, the software project node 211 may include a name, identifier, etc., of the software project in the ALM environment which can be used for identification and traceability.

The software object 210 further includes an included software node 212 that depends from the software project node 211 and which provides a proper and complete documentation of the software project including third party software, open source software, etc., which is essential for understanding licensing responsibilities of the software. Here, the ALM application knows which versions are included and can provide support documentation thus preserving this information for subsequent processing which can be difficult to obtain within the PLM environment. The open source software must be aligned with company compliance guidelines while the third-party software must be documented to calculate any royalties, licensing requirements, etc. The data included software node 212 provides traceability because it includes information that identifies software dependencies (open source and third-party) of the software program.

The software object 210 also includes a version node 213 that depends from the software project node 211 within the software object 210 and which includes information about the individual version information of the software that is ultimately implemented within the embedded system. Software is typically developed using an iterative process in which updates, modifications, fixes, etc., are continuously being performed for a software program. Thus, a software program may have many different versions. Typically, the version or versions of the software that have been tested and are working within the product in the PLM represent only a small subset of possible versions of the software available in the ALM. Therefore, keeping the version information of the working product within the version node 213 provides proof of the correct version of the software from the software developer, thus relieving a product engineer from trying to obtain such data after the fact. The version node 213 also includes a description sub-node 215 which provides a language-dependent description of the version, and an included version sub-node 214 which provides detailed version information of the software project which can be split in multiple sections such as major version, minor version, revision, build, etc.

FIG. 2 further shows how the data within the new software object 210 is mapped to a product instance 220 in a PLM environment. In this example, the data within the software project 211, the included software 212, and the included version 214, may be mapped to a materials object 221 of the PLM instance. The materials object 221 typically stores data about the structure of the embedded system including materials, electrical components, mechanical components, assemblies, sub-assemblies, etc. The system may store the software data attributes from the software project node 211, the included software node 212, and the included version node 214 within one or more underlying tables of the materials object 221 such as shown in FIGS. 3A-3C. As another example, the software data in the version node 213 and the description node 215 may be stored within a document information record object 223 of the product instance 220 in the PLM environment. The document information record object 223 may include tables/containers that are capable of holding documents (such as versioning information, etc.) of the software program making it a good fit for the version data.

By transforming the software data within the software object 210 into predefined objects of the PLM instance 220, the software data can be processed within the PLM environment. That is, the transformation provides a bridge between data within the ALM environment to the PLM environment while preserving the detailed information, documents, versions, etc. of the software which is unique to the ALM environment. Thus, additional processing on the PLM product instance 220 may be performed on the software component data as well as the mechanical component data and the electrical component data. It should also be appreciated that the mapping shown in FIG. 2 are an example, and may be different if desired. For example, the version information may be mapped to the engineering change management object 224 or the classification object 225. Therefore, the mappings shown in FIG. 2 should not be construed as limiting the example embodiments but rather server as an example of how such mappings may be performed.

FIGS. 3A-3C illustrate data structures storing software data attributes in accordance with example embodiments. The examples of FIGS. 3A-3C illustrate examples of data structures (e.g., tables, rows, columns, etc.) within the PLM instance that can be used to store the ALM data of the software program of an embedded system. The table may include an identifier of the value (left-side) and a field (right-side) for storing the corresponding value of the identifier. FIG. 3A illustrates an example of a software project table 310 which corresponds to the software project node 211 in FIG. 2. Here, the software project table 310 may be stored within the materials object 221 shown in FIG. 2 and may include fields for storing information about the software program in the ALM environment (ALM application) and the PLM environment (PLM application).

The software project table 310 may include a universal identifier of the software program that identifies the software program uniquely within the ALM and PLM environments. The software project table 310 may also include a project name of the software in the PLM, a project name of the software in the ALM (which may be different than the name in PLM), a URL which navigates to compiled code of the software project in the ALM that is implemented within the embedded system, a server address of the software project, a matter reference in the PLM, and a language description of the software program from the software project in the ALM environment.

FIG. 3B illustrates an example of a software version table 320 which corresponds to the software version node 213 shown in FIG. 2 which may be stored in the document information record object 223 of the product instance in the PLM environment. Referring to FIG. 3B, the software version table 320 may include the same unique identifier as the software project table 310, which universally identifies the software program within the ALM and PLM environments. The software version table 320 may also include a project ID value which includes a name of the software program in the PLM, a software version value, which includes a name of the software version in the ALM, a mandatory update field which indicates whether a software update of the software program is mandatory, a build URL which includes navigation to a build of the software in the ALM, a build counter that references the internal count of the build of the product in the ALM, a build timestamp that includes a compilation time of the software build, a document key that references the document information record in the PLM, and a description field which is a description of the software derived from the build in the ALM environment.

FIG. 3C illustrates an example of a software dependency table 330 which corresponds to the included software node 212 of the software object 210 shown in FIG. 2. Here, the software dependency table 330 may include information needed for contemplating licensing, royalties, and the like, of the software program. The software dependency table 330 may be stored within the materials object 221 of the PLM product instance 220. The software dependency table 330 may include the same unique identifier as the software project table 310 and the software version table 320 which universally identifies the software program within the ALM and PLM environments. The software dependency table 330 may also include a unique technical identifier of the software version in the PLM, a type indicator which indicates whether the software is open source or licensed, an object type which identifies how the software is represented in the PLM, an ID of the included software, and an identifier of the included software version.

Traceability is an important aspect in engineering and development especially for cross-domain development of products. Therefore, it can be beneficial to document the potential impact and dependencies of a software program to answer questions such as which specific software version is embedded within a product, where are the third party licenses included (for tracking royalties and compliance), where are the software files (binaries, hex-files, etc.) to be flushed on a PCB, which maintenance and service area must be informed when new version of the software are available, and the like. The questions can only be answered with a clear documentation of dependencies between ALM (software development and lifecycle management) and the seamless integration of relevant data and representatives in the product model for the subsequent overall product lifecycle management (PLM) processes.

Figure 4:
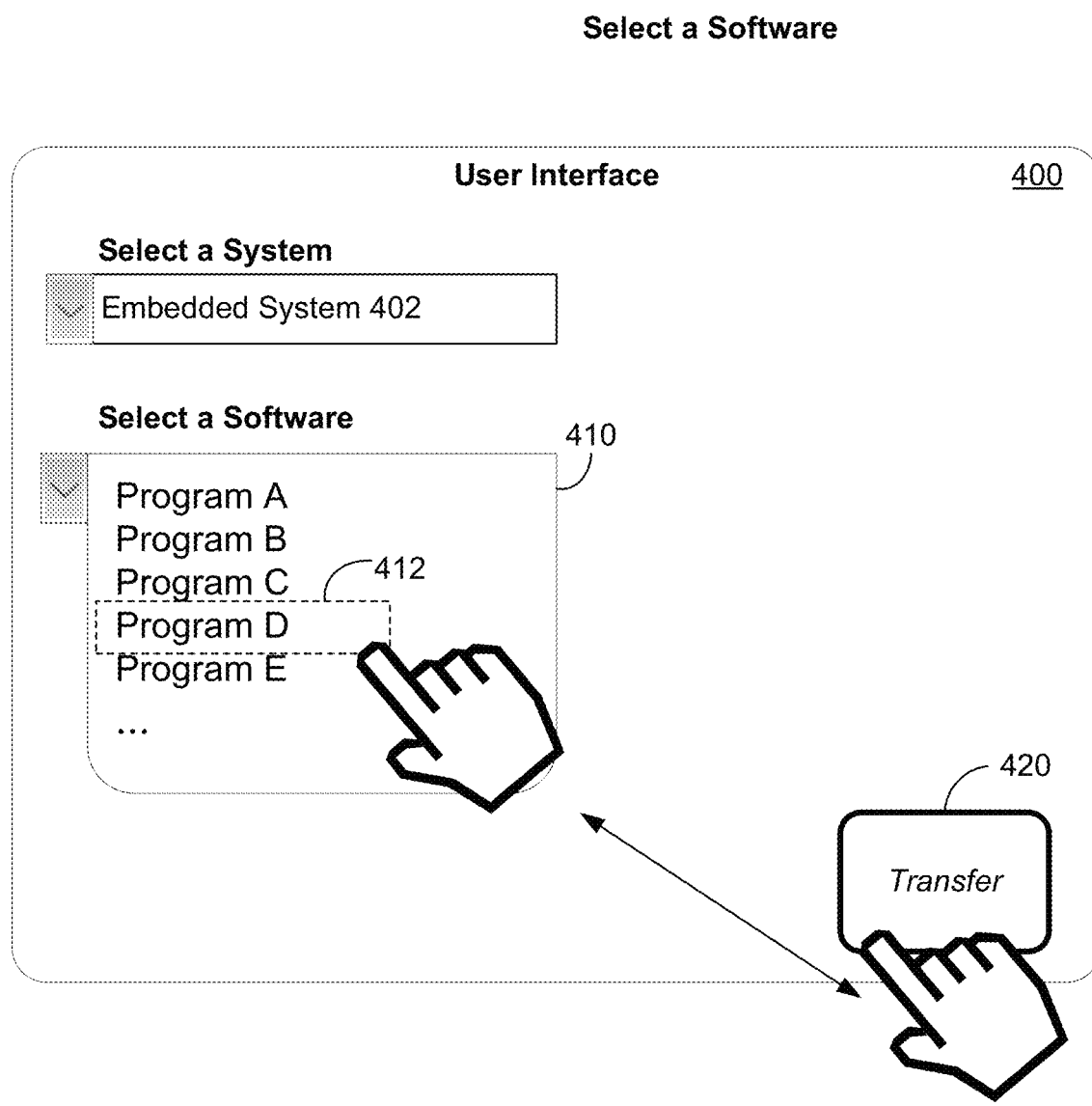
FIG. 4 is a diagram illustrating a user interface for selecting a software program to add to a PLM instance in accordance with an example embodiment.

FIG. 4 illustrates a user interface 400 for selecting a software program to add to a PLM instance in accordance with an example embodiment. For example, the user interface 400 may be displayed within an ALM console, a PLM console, or a self-standing UI that is independent of the ALM and the PLM environment. In this example, the user interface 400 displays a list of available software programs of an embedded system that can be incorporated into a PLM instance of the embedded system. In this example, the user uses a cursor to select a product instance 402 of an embedded system from the PLM environment. Furthermore, the user may initiate a drop down menu 410 and select a software program 412 from the ALM environment. The user may select a transfer button 420 which causes the system to extract data attributes of the selected program 412 from the ALM environment and add them into the selected product instance 402 of the embedded system in the PLM environment.

Figure 5:
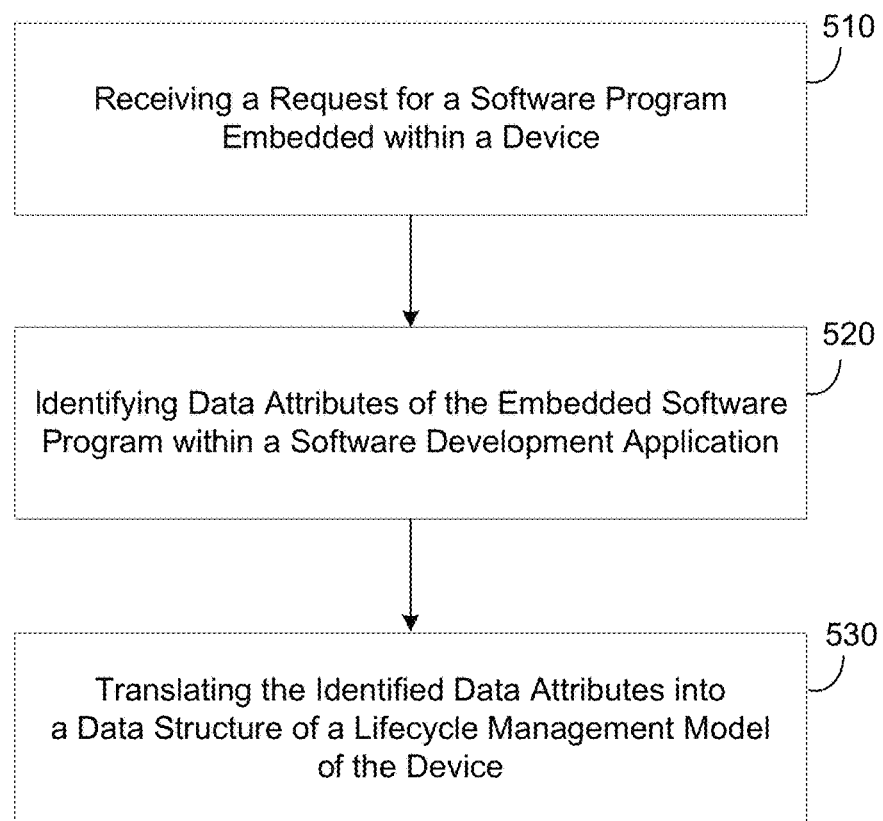
FIG. 5 is a diagram illustrating a method of translating software data attributes into a lifecycle management instance in accordance with an example embodiment.

FIG. 5 illustrates a method 500 of translating software data attributes into a lifecycle management model in accordance with an example embodiment. For example, the method 500 may be executed by a program that is running on a database node, a cloud platform, a web server, a computing system (user device), a combination of devices/nodes, or the like. Referring to FIG. 5, in 510 the method may include receiving a request for a software program of an embedded system. For example, the request may be a user input selecting the software program or typing a name of the software program via a user interface.

In 520, the method may include identifying data attributes of the software program within a software development application, where the data attributes comprise a description of the software program and a build version of the software program. For example, the data attributes may be identified based on predefined/default attributes that the system elects to add to a product instance in a PLM environment. As another example, the data attributes may be dynamically configured by a user of the system.

In 530, the method may include translating the identified data attributes of the software program into a predefined data structure of a lifecycle management instance of the embedded system. For example, the translating may include extracting the data attributes from the ALM environment and storing the extracted data attributes within one or more data objects of a product instance in the PLM environment. In other words, the translating may include mapping the extracted data attributes into predefined fields of the product instance.

In some embodiments, the translating may include translating the description of the software program into a materials record within the predefined data structure. In some embodiments, the translating may include translating the build version of the software program into a document information record within the predefined data structure. In some embodiments, the translating the build version may include translating a version label of the software program and a build counter of the software program into different fields of the predefined data structure. In some embodiments, the translating may further include translating a network address of the software program from the software lifecycle application into a field of the predefined data structure.

In some embodiments, the translating may further include translating a name of the software program into a field of the predefined data structure. In some embodiments, the translating may further include translating software dependency information of the software program into one or more fields of the predefined data structure. In some embodiments, the predefined data structure comprises one or more underlying data tables of one or more data objects within the lifecycle management instance of the embedded system.

Figure 6:
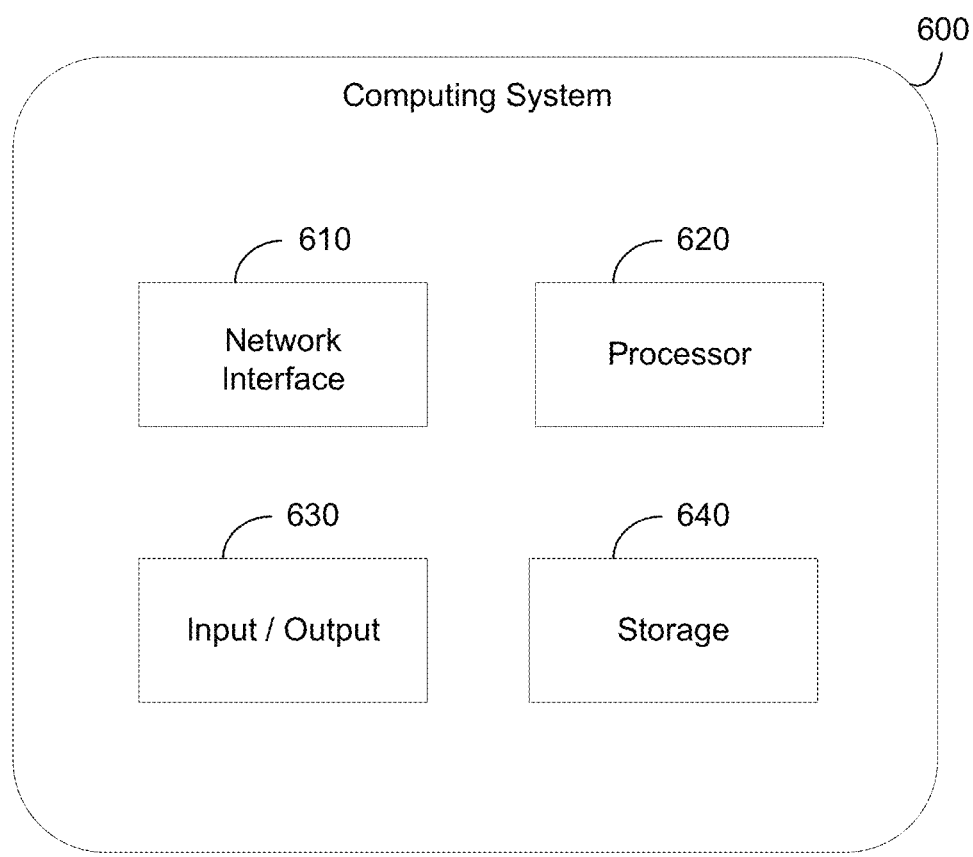
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a microphone, a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other non-transitory instructions which can be executed by the processor 620 to perform the methods and processes described herein. The storage 640 may include a data store having a plurality of tables, partitions and sub-partitions. The storage 640 may be used to store database records, objects, items, entries, and the like. Also, the storage 640 may be queried using SQL commands.

According to various embodiments, the processor 620 may receive a request that identifies a software program of an embedded system. For example, the request may come from another software program, a user interface, a network device, etc. The processor 620 may identify data attributes of the software program within a software development application, where the data attributes comprise a description of the software program and a build version of the software program. Furthermore, the processor 620 may translate the identified data attributes of the software program into a predefined data structure of a lifecycle management instance of the embedded system.

In some embodiments, the processor 620 may translate the description of the software program into a materials record within the predefined data structure. For example, the processor 620 may translate the build version of the software program into a document information record within the predefined data structure. In some embodiments, the processor 620 may translate a version label of the software program and a build counter of the software program into different fields of the predefined data structure. In some embodiments, the processor 620 may translate a network address of the software program from the software lifecycle application into a field of the predefined data structure. In some embodiments, the processor 620 may translate a name of the software program into a field of the predefined data structure. In some embodiments, the processor 620 may translate software dependency information of the software program into one or more fields of the predefined data structure. In these examples, the predefined data structure may include one or more underlying data tables of one or more data objects within a product lifecycle management instance of the embedded system.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
receive a request that identifies a software program of an embedded system,
identify data attributes of the software program within nodes of a hierarchical storage structure of an application lifecycle management (ALM) application, where the data attributes comprise a description of a software program and a build version of the software program,
map the nodes of the hierarchical storage structure of the ALM application to objects within a predefined data structure of product lifecycle management (PLM) instance of a product that includes the embedded system within a PLM application, and
integrate the identified data attributes of the software program included in the hierarchical storage structure of the ALM application into the mapped data objects within the predefined data structure of the PLM instance
wherein the processor is configured to translate the build version of the software program from a node of the hierarchical storage structure of the ALM application into a document information data object within the predefined data structure of the PLM instance, translate a version label of the software program from the node of the hierarchical storage structure of the ALM application and a build counter of the software program into different data objects of the predefined data structure, and translate a network address of the software program from the node of the hierarchical storage structure of the ALM application into a data object of the predefined data structure of the PLM instance.

2. The computing system of claim 1, wherein the processor is configured to translate the description of the software program from a node of the hierarchical storage structure of the ALM application into a materials data object within the predefined data structure of the PLM instance.

3. The computing system of claim 1, wherein the processor is configured to translate a name of the software program from a node of the hierarchical storage structure of the ALM application into a data object of the predefined data structure of the PLM instance.

4. The computing system of claim 1, wherein the processor is configured to translate software dependency information of the software program from a node of the hierarchical storage structure of the ALM application into a data object of the predefined data structure of the PLM instance.

5. The computing system of claim 1, wherein the predefined data structure comprises one or more underlying data tables of data content from one or more data objects within the PLM instance.

6. A method comprising:
receiving a request for a software program of an embedded system;
identifying data attributes of the software program within nodes of a hierarchical storage structure of an application lifecycle management (ALM) application, where the data attributes comprise a description of a software program and a build version of the software program;
mapping the nodes of the hierarchical storage structure of the ALM application to objects within a predefined data structure of product lifecycle management (PLM) instance of a product that includes the embedded system within a PLM application; and integrating the identified data attributes of the software program included in the hierarchical storage structure of the ALM application into the mapped data objects within the predefined data structure of the PLM instance, wherein the integrating comprises translating the build version of the software program from a node of the hierarchical storage structure of the ALM application into a document information data object within the predefined data structure of the PLM instance, translating a version label of the software program from the node of the hierarchical storage structure of the ALM application and a build counter of the software program into different data objects of the predefined data structure of the PLM instance, and translating a network address of the software program from the node of the hierarchical storage structure of the ALM application into a data object of the predefined data structure of the PLM instance.

7. The method of claim 6, wherein the translating comprises translating the description of the software program from a node of the hierarchical storage structure of the ALM application into a materials data object within the predefined data structure of the PLM instance.

8. The method of claim 6, wherein the translating further comprises translating a name of the software program from a node of the hierarchical storage structure of the ALM application into a data object of the predefined data structure of the PLM instance.

9. The method of claim 6, wherein the translating further comprises translating software dependency information of the software program from a node of the hierarchical storage structure of the ALM application into one or more data objects of the predefined data structure of the PLM instance.

10. The method of claim 6, wherein the predefined data structure comprises one or more underlying data tables of data content from one or more data objects within the PLM instance.

11. A non-transitory computer-readable medium comprising instructions which when executed by a processor cause a computer to perform a method comprising:

receiving a request that identifies a software program of an embedded system;

identifying data attributes of the software program within nodes of a hierarchical storage structure of an application lifecycle management (ALM) application, where the data attributes comprise a description of a software program and a build version of the software program; and mapping the nodes of the hierarchical storage structure of the ALM application to objects within a predefined data structure of product lifecycle management (PLM) instance of a product that includes the embedded system within a PLM application;

integrating the identified data attributes of the software program included in the hierarchical storage structure of the ALM application into the mapped data objects within the predefined data structure of the PLM instance, wherein the integrating comprises translating the build version of the software program from a node of the hierarchical storage structure of the ALM application into a document information data object within the predefined data structure of the PLM instance, translating a version label of the software program from the node of the hierarchical storage structure of the ALM application and a build counter of the software program into different data objects of the predefined data structure of the PLM instance, and translating a network address of the software program from the node of the hierarchical storage structure of the ALM application into a data object of the predefined data structure of the PLM instance.

12. The non-transitory computer-readable medium of claim 11, wherein the translating comprises translating the description of the software program from a node of the hierarchical storage structure of the ALM application into a materials data object within the predefined data structure of the PLM instance.

13. The non-transitory computer-readable medium of claim 11, wherein the translating further comprises translating software dependency information of the software program from a node of the hierarchical storage structure of the ALM application into one or more data objects of the predefined data structure of the PLM instance.

* * * * *